United States Patent [19]

Hamanaka et al.

[11] Patent Number: 5,560,380
[45] Date of Patent: Oct. 1, 1996

[54] METHOD AND APPARATUS FOR PROCESSING HOLLOW BODIES FILLED WITH METALLIC SODIUM

[75] Inventors: Ryomyo Hamanaka, Kyoto; Makoto Kondo, Shiga-ken, both of Japan

[73] Assignee: Mitsubishi Jukogyo Kabushiki Kaisha, Tokyo, Japan

[21] Appl. No.: 324,308

[22] Filed: Oct. 17, 1994

[30] Foreign Application Priority Data

Oct. 18, 1993 [JP] Japan ................................ 5-260051

[51] Int. Cl.⁶ ....................................... B08B 15/02
[52] U.S. Cl. .................... 134/148; 134/152; 134/166 R; 134/200; 134/169 A; 239/272
[58] Field of Search ................ 134/166 R, 200, 134/170, 148, 152, 201, 169 R, 113, 115, 135, 167 R, 198, 169 A; 239/271, 272

[56] References Cited

U.S. PATENT DOCUMENTS

| | | |
|---|---|---|
| 2,603,858 | 7/1952 | Bruce et al. . |
| 2,668,550 | 2/1954 | Burge . |
| 3,739,471 | 6/1973 | Peres . |
| 3,918,961 | 11/1975 | Maffei et al. . |
| 4,039,350 | 8/1977 | Bucy et al. ............................. 134/152 |
| 4,058,412 | 11/1977 | Knapp et al. . |
| 4,106,701 | 8/1978 | Siefken . |
| 4,111,716 | 9/1978 | Stevenson ........................... 134/166 R |
| 4,119,114 | 10/1978 | Bolton et al. . |
| 4,161,440 | 7/1979 | Wright . |
| 4,409,775 | 10/1983 | Brody et al. ......................... 134/152 X |
| 4,697,740 | 10/1987 | Ivy ........................................ 239/271 |
| 4,702,267 | 10/1987 | Ashraft . |
| 5,033,492 | 7/1991 | Mertens et al. ..................... 134/166 R |
| 5,135,014 | 8/1992 | Beswick ................................ 134/152 |
| 5,174,828 | 12/1992 | Roth ...................................... 239/272 |
| 5,186,195 | 2/1993 | Wall .................................... 134/166 R |

FOREIGN PATENT DOCUMENTS

| | | |
|---|---|---|
| 6014510 | 7/1985 | Japan . |
| 3010021 | 1/1991 | Japan . |
| 6949549 | 2/1994 | Japan . |

*Primary Examiner*—Frankie L. Stinson
*Attorney, Agent, or Firm*—Anderson Kill Olick & Oshinsky, P.C.

[57] ABSTRACT

A method for safely cutting hollow bodies filled with metallic Na for disposal comprises the steps of cutting the hollow bodies with plasma jet so as to oxidize metallic Na while conveying said hollow bodies in a hermetically sealed housing, throwing the cut hollow bodies into a neutralizing aqueous solution tank, then taking out said cut hollow bodies from the tank, collecting a fume produced while cutting the hollow bodies, spraying water over the fume and recovering the fume. An apparatus for carrying out the above method is also disclosed.

4 Claims, 2 Drawing Sheets

HOLLOW VALVE BODY    MOLTEN Na

TURBULENCE / NEGATIVE PRESSURE

METHOD AND APPARATUS FOR PROCESSING HOLLOW BODIES FILLED WITH METALLIC SODIUM

BACKGROUND OF THE INVENTION

1. Field of the Invention

The present invention relates to a method and an apparatus for processing engine valves, and particularly to a processing method and apparatus which are used when used hollow bodies filled with metallic sodium (Na), such as a metallic sodium engine valves or the like employed as valves for internal combustion engines, is disposed of.

2. Description of the Related Art

Recently, requirements on automobile engines are becoming increasingly higher toward better efficiencies, lower fuel consumption, lighter weight, and lower noise in view of tightening regulations (for example, the U.S CAFE regulations and the like). As a result, requirements placed on engine valves have also become tighter for higher operating temperatures, increases in the number of valves used, and decreases in their weight, because an increasing number of engines now burn fuel at leaner air-to-fuel ratios.

One of the most effective means among solutions to such problems is a hollow engine valve filled with metallic sodium (Na). As shown in FIG. 3, a metallic sodium-filled hollow engine valve 1 achieves lighter weight by having a hollow inner cavity in the valve body 2. Due to reduced kinetic energy losses, it also shows reduced fuel consumption and is more quiet because noise is reduced when the valve is seated. Furthermore, the hollow engine valve also achieves higher heat transfer efficiency with metallic sodium (hereinafter referred to as "metallic Na") filled in the hollow valve body. Metallic sodium exhibits characteristic properties of a low specific gravity, a low melting point and a high heat transfer coefficient, so that the hollow engine valve filled with metallic Na can deal with higher temperatures of combustion gas.

The use of the metallic Na-filled hollow engine valve 1 has been gradually increasing mainly for high-end models of automobiles, and is now spreading for also mid-range cars with increasing numbers of valves used. Metallic Na is extremely active and dangerous, so that insertion or filling of metallic Na is carried out under strict control during the manufacturing stage. After the car is sold to the final user, however, such metallic Na-filled hollow engine valves are discarded, and may be cut off together with conventional solid engine valves and come into contact with water at a service garage for regulatory or periodical inspections or at a wrecking yard. In such cases, explosion may occur due to heat evolution and generation of dissolution gas, and alkaline water is violently produced as caustic soda is produced. Products of such chemical reactions cause burn and dermatopathy, and when a product Gets into the eye, serious damages such as ablepsia or blindness arise.

Accordingly, as a conventional method for processing metallic Na-filled engine valves, such engine valves which are apparently filled with metallic Na are separated and collected, and then these metallic Na-filled engine valves are carefully cut off under dry conditions by means of a grinder cutter, saw or the like provided with a long handle while keeping a certain distance away from the operator. Then, as shown in FIG. 4, these engine valves thus cut off are thrown into a container 5 filled with water 4 from a distant place, whereby metallic Na reacts with water in accordance with the following chemical equation to produce aqueous NaOH and $H_2$ gas 6.

$$2Na + 2H_2O \rightarrow 2NaOH + H_2$$

Then, the hollow valve body 2 now containing no Na is taken out from the container after the reaction is completed for further processing.

However, the conventional method of processing engine valves filled with metallic Na involves the following problems:

I. Since the engine valves are mechanically cut off one by one prior to underwater treatment,
 (1) it is difficult to carry out the whole operation safely,
 (2) Na ignites and scatters, forming a jet, due to heat at the time of cutting, and
 (3) if fine powder of metallic Na formed and scattered at the time of cutting or fine powder of $Na_2O$ produced by the reaction of Na with the atmospheric gas gets into the eye, sodium hydroxide (NaOH) is produced by the reaction of the fine powders with tear ($H_2O$) as expressed in the following equations:

$$4Na + O_2 \rightarrow 2Na_2O$$

$$Na_2O + H_2O \rightarrow 2NaOH$$

and as a result, eye irritation is caused.

II. Since the engine valves are thrown into water,
 (4) the metallic Na left inside a valve violently produces $H_2$ gas. The $H_2$ gas may catch fire, and there exists a danger of hydrogen explosion when such engine valve is treated in a closed room which happens to be badly ventilated.
 (5) Since the specific gravity of Na flowing out of a valve after the valve has been cut off is smaller than that of water, Na floats on the surface of water and leaps on it to form a red-hot molten metal. $H_2$ produced from water is absorbed by the molten metal, and as a result, the red-hot molten metal itself explodes and scatters, so that it is required for the operator to be several meters away from the container for processing the engine valves.

SUMMARY OF THE INVENTION

The present invention has been made in view of the circumstances described above, and an object of the invention is to provide a method and apparatus for processing metallic Na-filled hollow bodies which provide superior operating conditions than conventional ones and prevent Na from igniting, jetting and scattering due to heat at the time of cutting the hollow bodies off. Furthermore, according to the method and apparatus of the present invention, there is no fear of eye irritation due to fine powder of $Na_2O$ derived from metallic Na fine powder scattered at the time of cutting. Hydrogen explosion, and self-blasting explosion and scattering of red-hot molten metal due to the Na flowing out of the hollow valves can be prevented.

A first aspect of the present invention relates to a method for processing metallic Na-filled hollow bodies, comprising the steps of: cutting the metallic Na-filled hollow bodies in such a manner as to oxidize metallic Na while continuously conveying said hollow bodies in a hermetically sealed housing; throwing the cut hollow bodies into a neutralizing aqueous solution tank for neutralization; then taking out said cut hollow bodies from the tank; collecting fume produced while cutting the hollow bodies; and spraying water over the fume and recovering the fume into said neutralizing aqueous solution tank.

A second aspect of the present invention relates to an apparatus for processing hollow bodies filled with metallic Na, comprising: a hermetically sealed housing provided with a door; a conveyor placed in the hermetically sealed housing for continuously conveying the hollow bodies filled with metallic Na; a cutting device which is disposed in said hermetically sealed housing and at a suitable place on a conveying route of said conveyor for cutting said hollow bodies while oxidizing metallic Na contained in said hollow bodies; a neutralizing aqueous solution tank which is disposed under said cutting device in said hermetically sealed housing for receiving the cut hollow bodies; a collecting hood provided with suction fan 23 which hood is disposed over said cutting device in said hermetically sealed housing for sucking and collecting a fume produced at the time of cutting the hollow bodies; and a reaction device 26 for spraying water to the collected fume to bring the fume into contact with water for reaction therebetween, so as to recover the fume into said neutralizing aqueous solution tank.

An example of said cutting device used in the present invention includes a plasma jet cutter, $CO_2$ laser beam cutter and YAG laser beam cutter. The plasma jet cutter may preferably be a plasma torch which utilizes air or oxygen to produce a plasma flow.

In the present invention, it is desirable to dispose an opening and closing type hopper for once receiving the cut hollow bodies between said cutting device and said neutralizing aqueous solution tank, and then dropping them into the neutralizing aqueous solution tank.

In the present invention, it is also desirable to provide an automatic neutralizing device which measures the pH of the aqueous solution contained in the neutralizing aqueous solution tank to automatically maintain the pH at a prescribed value.

In the following, how the method and apparatus of the present invention operate will be discussed.

(1) A cutting torch may be fixed and a conveyor which varies the traveling speed is provided, so that a supplying and cutting mechanism for materials to be cut (engine valves filled with Na) is simplified. It should be noted here that even if the cutting torch is made to be movable, a mechanism for continuously supplying valves to be cut off will be necessary and the provision of moving mechanisms for the cutting torch would rather be redundant and wasteful.

If the speed of the conveyor belt is varied automatically (by way of sequence control), after one of Na-filled valves on a plurality of V blocks which are disposed at constant distances therebetween on the conveyor is cut off, it becomes possible to move those V blocks by the constant distance at a faster speed before another valve on the next block is cut off, so as to eliminate time losses associated with movement of the valves between cutting operations. When a valve is actually being cut the valve should be moved at an optimal speed for cutting, which is slower than the preferable motion between cutting events. It should be noted in particular that since each Na-filled valve is cut off at its circular shaft portions, it is desirable to change the moving speed of the valve as the thickness along the cutting direction changes from zero at its one periphery and to a maximum at its center and zero at the other periphery.

(2) For cutting Na-filled valves, any manner by which valve shaft portion can be fused and cut and Na is oxidized can be utilized. However, heat-resistant steels containing large amounts of Cr, Mn, Ni, Mo, etc. (for example, JIS G4311, SUH35 0.5C-21Cr-4Ni-9Mn steel, and SUH3 0.4C-11Cr-1Mo-2Si steel) are used for engine valves. Because the temperature of ordinary oxyacetylene flame may be as low as about 1800° C., high-melting chromium oxide film ($Cr_2O_3$ (melting point: 1990° C., boiling point: 3000° C.) is formed so as to make it impossible to cut valves with such flame.

In this respect, from the view point of economy, such as equipment costs and running costs, and cutting performance, transfer-type plasma arc jet using air or oxygen, or arc welding which uses inexpensive carbon electrodes as well as a mechanism for automatically lowering the electrodes as the electrode becomes shorter may be utilized in the present invention, whereby a plasma temperature of 5000°–6000° C. or an arc temperature of 3500°–5000° C. is obtained. As a result, since air or oxygen is used in the present invention, the shaft portion of the valves can easily be cut off, and the metallic Na contained inside the valve can be oxidized with ionized oxygen [$O^-$] in an extremely active plasma so as to convert the metallic Na into sodium oxide $Na_2O$ at a very high reaction rate. While the conversion of Na is an exothermic reaction, such exothermic energy is relatively minor as compared with plasma temperature and its thermal energy. Also, since the Na is carried along with plasma jet stream, its scattering direction is directed to a single direction: downward. Therefore, the oxidative reaction can be kept under control.

It is to be noted that while $CO_2$ or YAG laser with oxygen being used as assistant gas may also be utilized for cutting valves with similar favorable results as described above, but the required equipment would be more expensive.

(3) $Na_2O$ is produced from metallic Na at the time of plasma cutting and initially forced downward along with plasma jet, but $Na_2O$ tends to turn into fine white powder so that white smoke spreads and permeates with convection of surrounding air. Such white smoke can be sucked by a collecting fan which has a hood so that the scattering and permeation of $Na_2O$ fine powder in a hermetically sealed housing can be prevented.

The sucked white smoke then contacts and reacts with the water films or water droplets supplied from the spray nozzle, NaOH is produced in accordance with the following reaction formula:

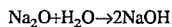

$$Na_2O + H_2O \rightarrow 2NaOH$$

and collected into the neutralizing tank through the hole of lower drain. The $Na_2O$ white smoke which did not sufficiently react with spray water is discharged back into the hermetically sealed housing through the lower drain hole, and circulates again through the supplying fan to come in contact with water drops to produce an alkali aqueous solution which is stored in the neutralizing tank.

(4) It is contemplated that the performance of cutting the valve shaft, such as the thickness that can be handled and the cutting speed, can be improved by utilizing "transfer-type plasma arc" (or sometimes called "transferred plasma arc") for which the cutting torch is used as a cathode and the Na-filled valve is used as an anode. Also, air or oxygen gas can be used as plasma gas, so as to improve the cutting of heat-resistant steels as well as to promote the oxidizing reactions of metallic Na; more specifically, the oxidation of Na remaining in the hollow valve.

(5) If an opening and closing type hopper is disposed below the proceeding end of the conveyor, the cut hollow valve pieces do not directly fall into the aqueous solution in the neutralizing tank which is located rather a long distance away from the conveyor, so that the scattering of the solution by the dropping valve pieces can be reduced. In addition, because a mechanism for intermittently opening and closing the hopper is disposed, cut valve pieces are once received by the hopper in a closed state and allowed to drop into the neutralizing tank so as to cool the cut valves and reduce the falling distance of cut pieces of valves whereby the scattering of water in the tank can be prevented.

(6) If a cage-like container is submerged into the neutralizing tank immediately under the opening and closing type hopper, cut valves that have been thrown into the container may be collectively taken out by pulling up the cage-like container.

(7) If supply and drain lines and valves are attached to the neutralizing tank, the water in the neutralizing tank can be replaced with relative ease.

(8) If a tank containing a dilute aqueous hydrochloric acid solution is provided in connection with the neutralizing tank, it becomes possible that the NaOH solution set forth in (3) above is neutralized with a supply of the acid solution from the HCl tank regulated in association with a pH sensor disposed in the neutralizing tank, whereby the solution in the neutralizing tank can be disposed as an NaCl (salt) solution which poses little problem in term of waste water disposal regulations.

(9) If the respective members and devices are enclosed in a container provided with an openable door at a suitable position, the scattering of $Na_2O$ white gas to the outside can be prevented. The provision of such an openable door makes it easy to place valves in and take them out of the apparatus, change parts, and inspect and maintain the devices. Also, the apparatus can be provided wheels so that it can be moved more freely to a suitable location.

According to the present invention, a method and apparatus for processing metallic Na-filled hollow bodies are provided. In accordance with the method and apparatus of the present invention, excellent operating conditions for workers in comparison with conventional methods can be attained. Also, it becomes possible to prevent the ignition, jetting and scattering of Na due to cutting heat, and the eye irritation due to $Na_2O$ fine powder derived from the metallic Na fine powder scattered at the time of cutting the hollow bodies can be avoided. Hydrogen explosion and self-blasting explosion and scattering of red-hot molten metals due to the Na flowing out from the valves can be prevented.

DETAILED DESCRIPTION OF THE PREFERRED EMBODIMENT

The apparatus for processing hollow bodies filled with metallic Na according to the present invention will be described in further details hereinbelow by referring to FIG. 1.

Figure 1:
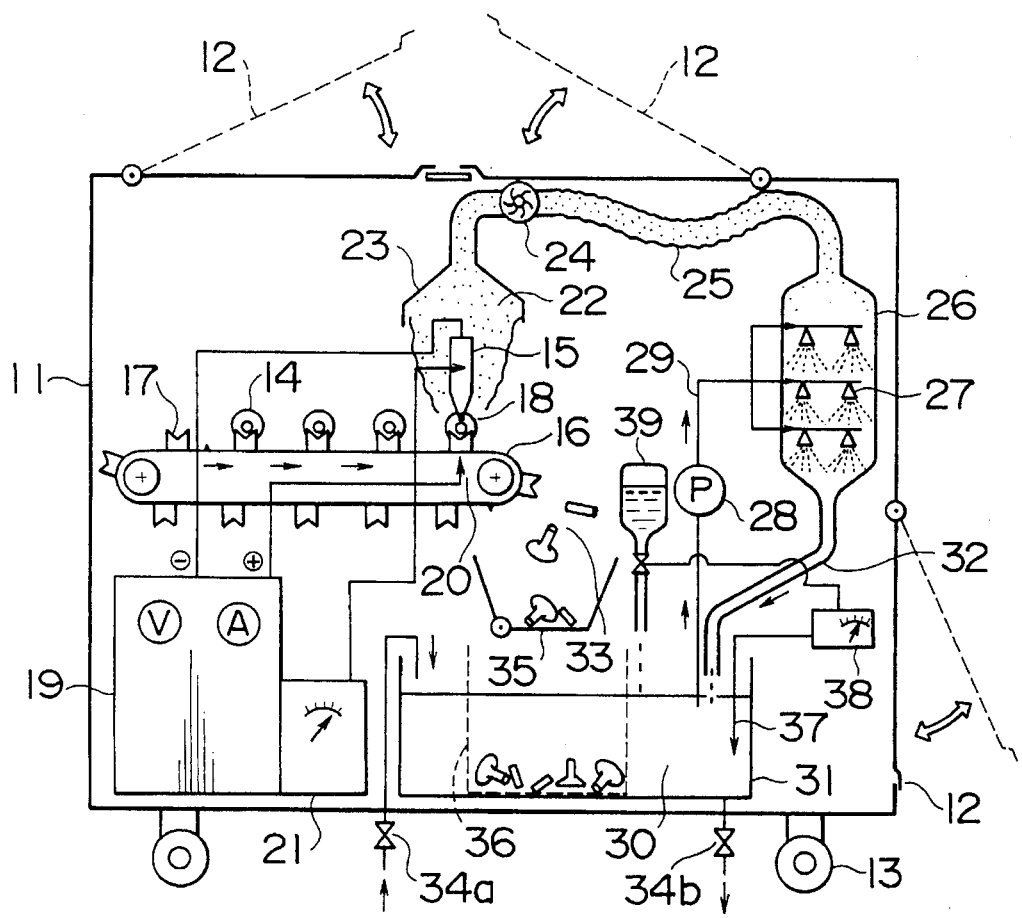
FIG. 1 is a diagram of the apparatus for processing metallic Na-filled hollow bodies according to an embodiment of the present invention.

In FIG. 1, a hermetically sealed housing 11 is provided with openable and closable doors 12 on the upper wall and the lower side wall. Also, the wheels 13 are provided at the bottom portion of the housing. In the hermetically sealed housing 11, a conveyor (conveying mechanism) 16 for supplying successively, and at a high speed, a prescribed number of used engine valves 14 filled with metallic Na to a position under a plasma cutting torch 15 is placed. In the figure, V blocks 17, and a plasma jet stream 18 are shown. In this arrangement, upon pushing a starting button of this apparatus, the engine valves 14 on the conveyor 16 are successively supplied under the plasma cutting torch 15 at a high speed, and upon detection of a valve, this valve is transversely traveled immediately under the torch at a lower predetermined cutting speed for cutting.

Air or oxygen plasma jet is used for cutting the engine valves 14. In this respect, if we may disregard current costs, particularly if the initial investment is out of consideration, a $CO_2$ or YAG laser may also be utilized to replace the plasma jet cutter.

The output cathode of a plasma jet power supply 19 is wired to the cutting torch 15, while the anode of the power supply 19 is wired to a slide-type feeding portion 20 which is electrically connected to a jig which carries an engine valve 14 on the conveyor 16. Namely, the "transfer-type plasma arc" can be used in the present invention as a type of plasma arc transfer for cutting valves off with plasma jet. Furthermore, a compressor 21 (or a pressurized oxygen bomb) is connected to the plasma cutting torch 15, and air or oxygen in ionized gaseous state (plasma gas) is jetted from the central portion of the torch.

Over the cutting torch 15, a fume collecting hood 23 for collecting fume 22 is disposed and connected to a reactor 26 through an expansible bellows 25 and via a supply fan 24. The reactor 26 includes a plurality of spray nozzles 27. An end of piping 29 having a circulating pump 28 is connected to the spray nozzles 27, and the opposite end of the piping 29 extends into a neutralizing tank 31 containing an aqueous solution 30. Furthermore, a lower drain 32 is disposed at the bottom of the reactor 26, and an end of the lower drain 32 is communicated with the neutralizing tank 31. To the neutralizing tank 31 connected are pipings for supply and drain with the respective supply valve 34$a$ and drain valve 34$b$.

Under the proceeding end of the conveyor 16, an opening and closing type hopper 35 which is intermittently opened and closed by a sequencer or the like in response to the movement of the conveyor 16 is placed. The cut engine valves 33 are received by the opening and closing type hopper 35. Immediately below the opening and closing hopper 35, a cage-like container 36 is submerged into the neutralizing tank 31 in a removable manner.

A pH sensor 37 is placed in the solution 30 contained in the neutralizing tank 31, and a pH meter 38 is connected to the pH sensor 37. In connection with this pH meter 38, a tank 39 containing dilute aqueous hydrochloric acid solution is disposed at a position higher than the neutralizing tank 31. Thus, an automatic neutralizing system is formed in such manner that when the aqueous solution in the tank 31 is found to reach a predetermined alkalinity (for example, pH=7.5. This value is a variable which can be preset.) as a result of a signal received from the pH sensor 37, the dilute aqueous hydrochloric acid solution in the tank 39 is allowed to drop by actuating an electromagnetic valve mounted at the bottom of the tank 39, and this valve is closed at the time when the solution reaches a predetermined acidity (for example, pH=6.5).

EXAMPLE 1

Into the housing having 850 mm width×500 mm depth×950 mm height, a chain conveyor having a total chain length of about 1300 mm was horizontally placed, twenty metal V blocks were mounted on the conveyor with 65 mm spacings in an electrically conductive manner with the conveyor. A plasma torch was fixed through a vertically adjustable sliding shaft at a position over the conveyor in the vicinity of the end portion thereof where the conveyor turns around downward. Then, the other component members were arranged as shown in FIG. 1. Now, the operation of major devices and results of cutting process of Na-filled hollow engine valves will be discussed hereinbelow.

(1) Air Plasma Cutter
  Manufactured by: Matsushita Denki Sangyo K.K., with some modifications added.
  Model: YP010P-5
  Primary power supply: 100 V, 60 Hz, single phase
  Rated output: 10 A, 70 V
  Gas flow: Air, with preflow for 1 second and after flow for 10 seconds
  Method: High frequency excitation method
  Torch: YT-015PCS
(2) pH Meter
  Manufactured by: Hanna Instrument Japan K.K.
  Type: HI87101, pH indication controller
  Range of pH measurement: 0.00–14.00 pH+/−0.01 pH (detection range)
  Primary power supply: 100 V, 60 Hz
(3) Supply Fan
  Suction rate: 0.5 m/min.
  Primary power supply: 100 V, 60 Hz
(4) Reactor (for $Na_2O+2H_2O \rightarrow 2NaOH$)
  Capacity: 3 liters
  Water spraying rate: 10 liters/min.
(5) Valve Under Test
  Material: JISG4311 SUH35 (21Cr-4Ni-9Mn steel)
  Hollow volume: 3.5 mm diameter×60 mm length
  Amount of Na: 0.35 g
(6) Test Results Nine metallic Na-filled hollow engine valves were set on nine V-blocks disposed on the upper surface of the conveyor, respectively, and then the starting button was pushed. A series of treatment steps of fully automatic cutting, fume suction, fume reaction, cut valve cooling, placement of cut valves into the neutralizing tank, and neutralizing reactions were completed, and a completion signal (buzzer sound and lighting of a light) was issued.

It took three minutes to cut off the nine valves, which meant a cutting cycle time per valve of 20 seconds. The period of time up to the completion of fume suction and fume reaction was seven minutes before the fume in the housing was perfectly removed.

EXAMPLE 2

A test similar to that of Example 1 was carried out with the exceptions that the plasma torch was substituted by a carbon electrode for arc gauging of 5 mm diameter×300 length, the plasma power supply was replaced by an a.c. arc welding machine, and a Z-axis (vertical) lifting mechanism was added for keeping arc voltage constant (40–45 V). Substantially the same results were obtained. It took about four minutes to finish cutting nine valves. The metallic Na was sufficiently oxidized by the oxygen present in the atmosphere, without supplementing pure oxygen, to convert it into $Na_2O$ of powder form, and the metallic Na scarcely remained.

Thus, according to the above described examples, the following advantages are obtained.

(1) As a result of processing metallic Na-filled hollow engine valves in the hermetically sealed housing 11 by utilizing air or oxygen plasma jet, a high-temperature concentrated energy beam (about 5000° C.) having excellent oxidizing capability is obtained, so that heat-resistant steels containing Cr, Ni, Mn and the like, and heat-resistant alloys (Inconel and the like) can securely be cut off in short periods of time. Furthermore, for the same reasons as described above, metallic Na is instantaneously oxidized as Na jets out in a stream formed at the time of cutting the hollow engine valves, and the resulting $Na_2O$ is directed downward along with the strong downward jet stream of the plasma. Thus, the scattering of $Na_2O$ in different directions can be prevented.

Figure 2:
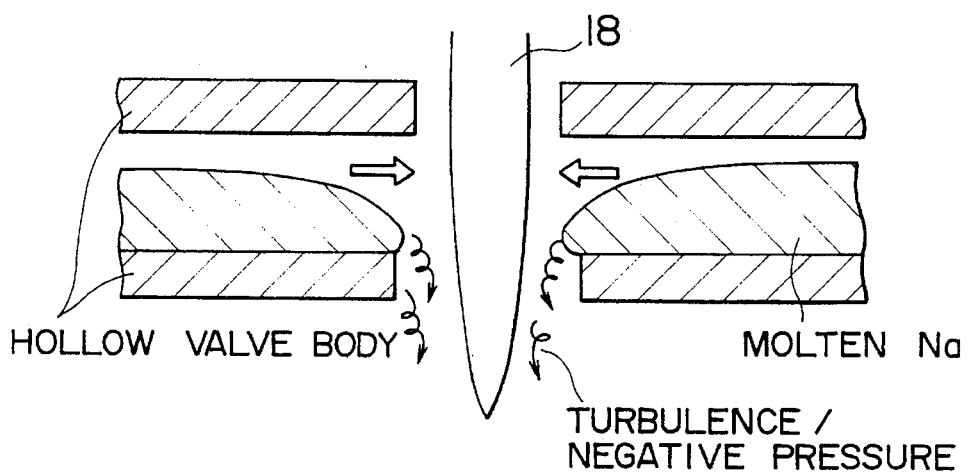
FIG. 2 is an explanatory view showing a mechanism of molten sodium flows from the hollow valve by means of plasma jet stream in accordance with the present invention.
Figure 3:
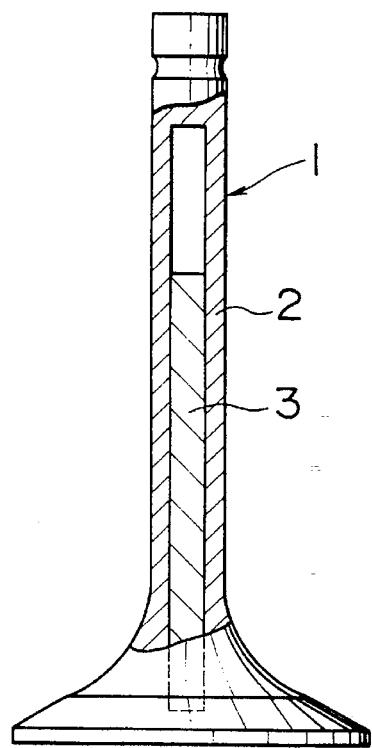
FIG. 3 is a partially cross sectional view of a metallic Na-filled hollow engine valve.
Figure 4:
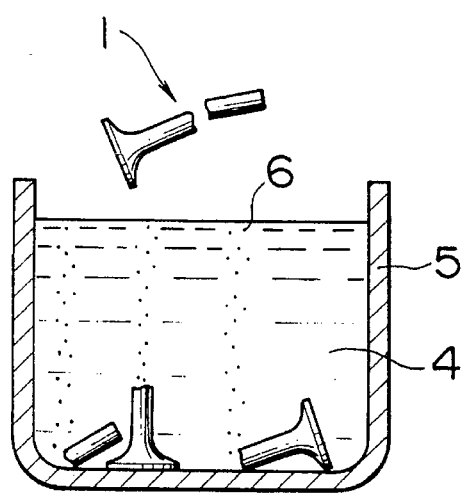
FIG. 4 is an explanatory view for a conventional method for processing metallic Na-filled hollow engine valves.

Moreover, as shown in FIG. 2, since high-temperature jet stream having strong oxidizing power is used, negative pressure appears in the side and downward portions of the jet, molten metallic Na (in the liquid state because the melting point of Na is low, i.e., 98° C.) is drawn out from the interior of the hollow valve so that most of metallic Na contained in the valve flows out. After cutting the hollow engine valve off, the remaining Na is exposed to air and converted into Na2O due to the excess heat the hollow valve has. In addition, since no water is involved in plasma jet cutting, and the cutting process is perfectly dry, $H_2$, which is quite dangerous, never occurs. Also, since the process is carried out in the hermetically sealed housing 11, the $Na_2O$ fume produced at the time of cutting engine valves stays inside the housing and does not come out of the housing 11.

(2) Because the reactor 26 which has the hood 23 for collecting the $Na_2O$ fume, the supply fan 24, and the spray nozzles 27 for water is placed in the hermetically sealed housing 11, the $Na_2O$ fume reacts with sprayed water and produces an aqueous alkali solution, so that the $Na_2O$ fume can be removed in a short period of time.

(3) Since the opening and closing type hopper 35 is disposed under the proceeding end of the conveyor 16, the valves cut and dropped from the conveyor end can be once received and then thrown into the neutralizing tank 31 from the opening and closing type hopper 35 with a shorter falling distance, so that scattering of the aqueous solution (principally, an aqueous solution of NaCl) from the neutralizing tank can be obstructed. Furthermore, since the cut valves 33 stay on the opening and closing type hopper 35 for a while, even if some Na remains in the hollow valves, it is possible to have sufficient time to completely oxidize such remaining Na by means of excess heat into $Na_2O$.

(4) The neutralizing tank 31 is provided with the tank 39 which cooperates with a pH meter for the treating solution in the neutralizing tank 31. Accordingly, materials deposited on the inside and outside of the cut valves 33 can be completely dissolved into the pH-adjusted aqueous solution in the neutralizing tank 31, so that clean cut valve pieces can be obtained which are then used as valuable scrap raw material, because the cut pieces no longer contain metallic Na, which cannot be removed at the time of re-refinement. If metallic Na remains, steels of lower quality would result.

We claim:

1. An apparatus for processing hollow bodies filled with metallic Na, comprising: a hermetically sealed housing provided with a door; a conveyor placed in the hermetically sealed housing for continuously conveying the hollow bodies filled with metallic Na; a cutting device which is disposed in said hermetically sealed housing and at a suitable place on a conveying route of said conveyor for cutting said hollow bodies while oxidizing the metallic Na contained in said hollow bodies; a neutralizing aqueous solution tank which is disposed under said cutting device in said hermetically sealed housing for receiving the cut hollow bodies; a collecting hood provided with a suction fan which hood is disposed over said cutting device in said hermetically sealed housing for sucking and collecting a fume produced at the time of cutting the hollow bodies; and a reactor for spraying water to the collected fume to bring the fume into contact with water for reaction therebetween, so as to recover the fume into said neutralizing aqueous solution tank.

2. An apparatus for processing hollow bodies filled with metallic Na as claimed in claim 1, wherein said cutting device is either one of an air or oxygen plasma jet cutter, a $CO_2$ laser beam cutter, or a YAG laser beam cutter.

3. An apparatus for processing hollow bodies filled with metallic Na as claimed in claim 1, wherein an opening and closing type hopper for once receiving the cut hollow bodies and then dropping them into the neutralizing aqueous solution tank is disposed between said cutting device and said neutralizing aqueous solution tank.

4. An apparatus for processing hollow bodies filled with metallic Na as claimed in claim 1, wherein an automatic neutralizing device which detects a pH of the aqueous solution contained in said neutralizing aqueous solution tank and maintains the pH at a prescribed value is further provided.

* * * * *